(12) United States Patent
Fevrier

(10) Patent No.: US 10,998,977 B2
(45) Date of Patent: May 4, 2021

(54) SYSTEM AND METHOD OF OPTICAL FIBER COMMUNICATION

(71) Applicant: Neptune Subsea IP Limited, London (GB)

(72) Inventor: Herve A. Fevrier, Miami, FL (US)

(73) Assignee: Neptune Subsea IP Limited, London (GB)

( * ) Notice: Subject to any disclaimer, the term of this patent is extended or adjusted under 35 U.S.C. 154(b) by 420 days.

(21) Appl. No.: 15/983,316

(22) Filed: May 18, 2018

(65) Prior Publication Data

US 2018/0269976 A1 Sep. 20, 2018

Related U.S. Application Data (63) Continuation of application No. PCT/GB2016/053613, filed on Nov. 21, 2016.

(60) Provisional application No. 62/258,360, filed on Nov. 20, 2015.

(51) Int. Cl.
*H04B 10/297* (2013.01)
*H04Q 11/00* (2006.01)
*H04B 10/25* (2013.01)

(52) U.S. Cl.
CPC ..... *H04B 10/2971* (2013.01); *H04B 10/2589* (2020.05); *H04Q 11/0005* (2013.01)

(58) Field of Classification Search
CPC .................................. H04B 10/2971
See application file for complete search history.

(56) References Cited

U.S. PATENT DOCUMENTS

| | | | | |
|---|---|---|---|---|
| 5,121,458 A | * | 6/1992 | Nilsson | G02B 6/4472 385/100 |
| 5,471,332 A | * | 11/1995 | Shiragaki | H04B 10/032 398/45 |
| 5,673,133 A | * | 9/1997 | Imaoka | H04L 7/0075 398/202 |
| 7,675,867 B1 | | 3/2010 | Mraz et al. | |
| 9,299,423 B2 | | 3/2016 | Baker et al. | |
| 9,680,283 B2 | * | 6/2017 | Wang | H04B 10/2941 |
| 2002/0012138 A1 | | 1/2002 | Graves et al. | |
| 2003/0194234 A1 | | 10/2003 | Sridhar et al. | |
| 2004/0114925 A1 | * | 6/2004 | Berthold | H04J 14/0294 398/45 |
| 2004/0202472 A1 | | 10/2004 | Giles et al. | |
| 2005/0111788 A1 | | 5/2005 | Tsuyama | |
| 2006/0110159 A1 | | 5/2006 | Hurt et al. | |
| 2007/0003283 A1 | * | 1/2007 | Feuer | H04J 14/025 398/83 |

(Continued)

FOREIGN PATENT DOCUMENTS

GB 2503245 A 12/2013

OTHER PUBLICATIONS

International Search Report and Written Opinion of the International Searching Authority for International Patent Application No. PCT/GB2016/051320 dated Aug. 9, 2016, 12 pages.

(Continued)

*Primary Examiner* — Eric L Bolda (57) ABSTRACT

A system includes (i) an optical link including multiple spans of optical fiber and multiple network elements and (ii) at least one switch configured to reverse a direction that at least one of the network elements communicates over the optical link.

20 Claims, 8 Drawing Sheets

(56) References Cited

U.S. PATENT DOCUMENTS

| | | |
|---|---|---|
| 2007/0237164 A1 | 10/2007 | Gazzola et al. |
| 2008/0037988 A1 | 2/2008 | Bullock |
| 2010/0103506 A1* | 4/2010 | Yang ................. H04B 10/2971 |
| | | 359/341.2 |
| 2015/0098477 A1 | 4/2015 | Li et al. |
| 2016/0337037 A1 | 11/2016 | Fevrier |

OTHER PUBLICATIONS

International Preliminary Report on Patentability for International Patent Application No. PCT/GB2016/051320 dated Nov. 23, 2017, 8 pages.
International Search Report and Written Opinion of the International Searching Authority for International Patent Application No. PCT/GB2016/053613 dated Feb. 3, 2017, 10 pages.
USPTO, Office Action (Restriction) for U.S. Appl. No. 15/152,358 dated Nov. 29, 2017, 19 pages.
USPTO, Office Action (Non-final) for U.S. Appl. No. 15/152,358 dated Mar. 30, 2018, 18 pages.
Morea et al., "Cost benefits of asymmetric IP-over-DWDM networks with elastic transceivers," OSA Publishing Conference Paper, TH1I, 2015 Optical Fiber Communication Conference, Mar. 2015, 3 pages.
Woodward et al., "Asymmetric Optical Connections for Improved Network Efficiency," Journal of Optical and Networking, vol. 5, No. 11, Optical Society of America, Nov. 2013, 7 pages.

* cited by examiner

SYSTEM AND METHOD OF OPTICAL FIBER COMMUNICATION

CROSS-REFERENCE TO RELATED APPLICATIONS AND PRIORITY CLAIM

This application claims priority as a continuation of International Patent Application No. PCT/GB2016/053613 filed on Nov. 21, 2016, which claims priority to U.S. Provisional Patent Application No. 62/258,360 filed on Nov. 20, 2015. Both of these applications are hereby incorporated by reference in their entirety.

This application is also related to U.S. Provisional Patent Application No. 62/159,694 filed on May 11, 2015. This provisional application is hereby incorporated by reference in its entirety.

TECHNICAL FIELD

This disclosure relates generally to optical networks. More specifically, this disclosure relates to a system and method for reversing the communication direction over an optical fiber to support asymmetrical communications or other functions in an optical network.

BACKGROUND

Optical communication networks are often used to transport large amounts of data over long distances very quickly. At present, sophisticated optical communication networks are capable of transmitting tens of trillions of bits of information per second over a single optical fiber spanning many kilometers. Optical communication networks generally exceed the bandwidth capabilities of copper networks. As a result, optical networks are often part of wireline telecommunication networks and are often used to provide optical backbones at the cores of the telecommunication networks.

SUMMARY

This disclosure provides a system and method for reversing the communication direction over an optical fiber to support asymmetrical communications or other functions in an optical network.

Other technical features may be readily apparent to one skilled in the art from the following figures, descriptions, and claims.

BRIEF DESCRIPTION OF THE DRAWINGS

Embodiments of the invention will be described, purely by way of example, with reference to the accompanying drawings, in which.

DETAILED DESCRIPTION

The figures, discussed in more detail below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure provides techniques for reversing the communication direction over an optical fiber to support asymmetrical communications or other functions in an optical network. These techniques can be used in a variety of optical communication networks, such as optical backbone networks, optical core networks, long-haul optical networks, and regional optical networks. The optical backbone or core networks can include terrestrial networks and subsea/submarine networks.

Figure 1:
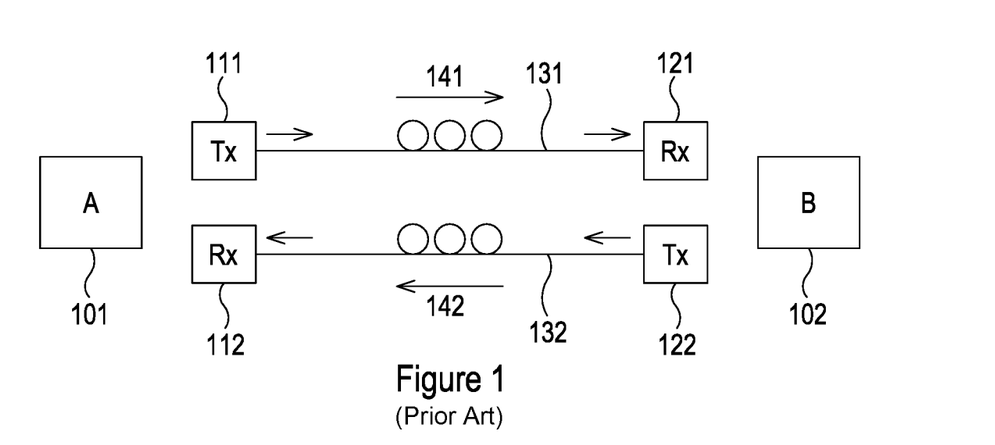
FIG. 1 is an illustration of a prior art single communication link between site A and site B.

Telecommunication optical networks are typically "structured" around the use of fiber pairs. That is, communications between two locations almost always occur over one or more pairs of optical fibers. One optical fiber in each pair is used to transport information in one direction, and the other optical fiber in each pair is used to transport information in the other direction. FIG. 1 illustrates one example of this concept for a simple case, namely a single communication link between site A and site B.

In FIG. 1, the elements labeled "Tx" 111, 122 and "Rx" 112, 121 denote the transmit parts and the receive parts of telecommunication equipment at the two sites A and B. While shown separately, the transmit and receive parts at a single location 111, 112 or 121, 122 are often implemented using a bidirectional interface card. In the example of FIG. 1, a single optical fiber connects is provided between each Tx element at one site (e.g. Tx 111, at site A) and each corresponding Rx element at the other site (e.g. Rx 121, at site B). The example shown in FIG. 1 could denote part of any suitable optical architecture, and this architecture can easily be expanded to support communications over a large number of communication links. As examples, the architecture could represent a simple one-channel Synchronous Optical Network (SONET) or Synchronous Digital Hierarchy (SDH) system up to a multi-channel Dense Wavelength Division Multiplexing (DWDM) system.

Figure 2:
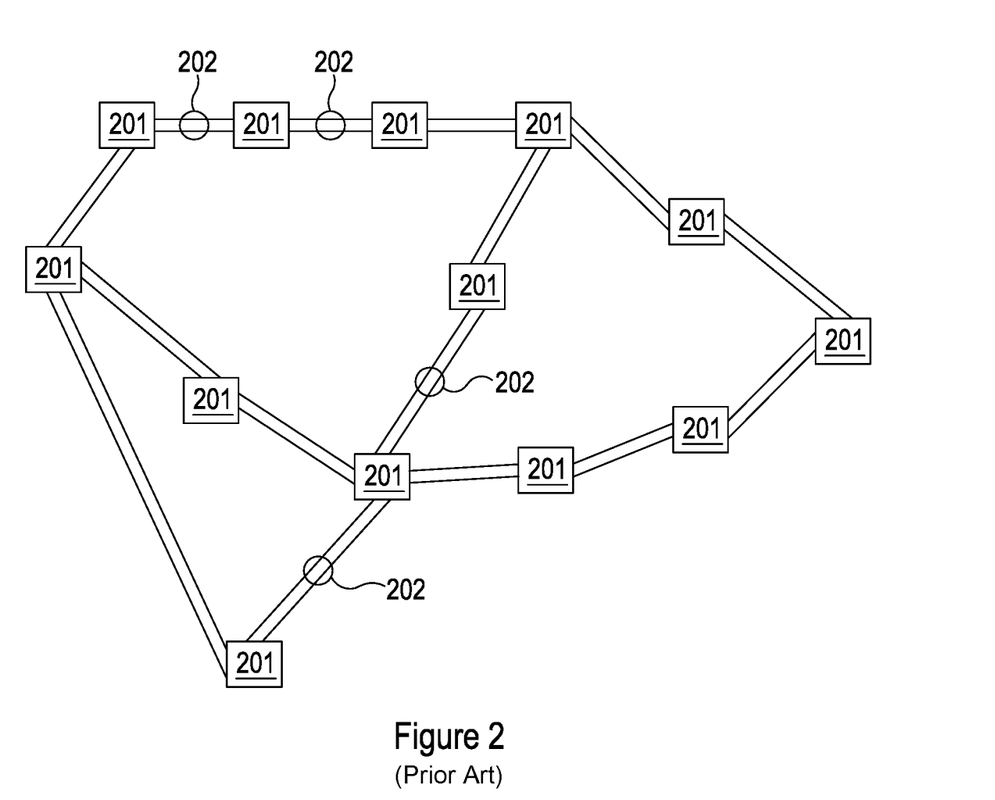
FIG. 2 is an example of an optical network according to the prior art.

In most conventional telecommunication optical networks, the optical networks are formed by a collection of network elements connected by pairs of optical fibers. FIG. 2 illustrates an example of such an optical network.

Each box in FIG. 2 denotes a network element 201, and the lines connecting different pairs of boxes denote pairs of optical fibers 202. Each network element could represent any suitable structure that performs any desired function in an optical network. For example, network elements 202 could include in-line amplifiers (ILAs) used for optical amplification, reconfigurable optical add/drop multiplexers (ROADMs) used for optical routing, and end-points or terminals where optical paths begin and terminate.

The approach shown in FIG. 2 has been the foundation of optical transmission systems for many years. Many transport technologies have been developed and deployed based on this foundation, such as SONET, SDH, Optical Transport Network (OTN), and Wavelength Division Multiplexing (WDM) systems.

Figure 3:
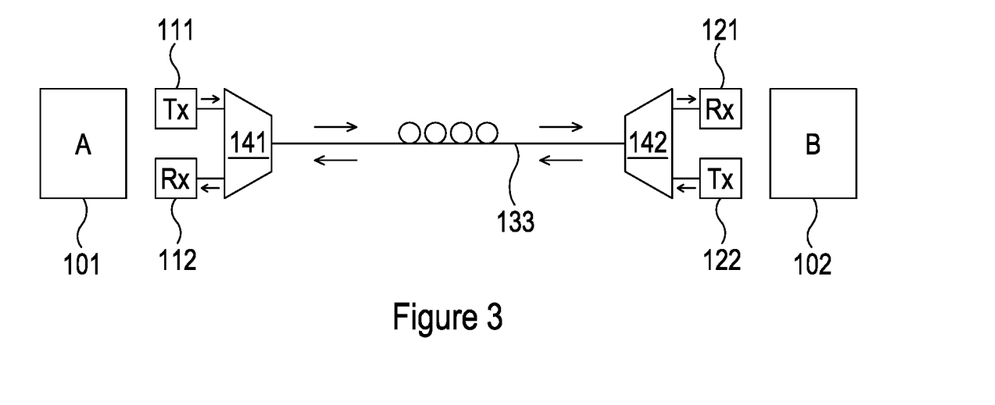
FIG. 3 is an example of a non-conventional approach to providing communication between site A and site B.

One non-conventional approach has been used from time to time that varies from this foundation. An example of this approach is shown in FIG. 3. In this non-conventional approach, a single optical fiber 133 is used to support the transmission of data in both directions between two locations (site A 101 and site B 102). Multiplexers/demultiplexers 141, 142 are used at both ends of the optical fiber 133 to control the direction of transmission.

The approach in FIG. 3 is usually used only for point-to-point communications involving organizations that do not have large amounts of data to be transported over an optical fiber. This approach has various benefits (such as reduced fiber costs) and drawbacks (such as reduced performance).

As noted above, optical backbone or core networks include terrestrial networks and subsea/submarine networks. For subsea/submarine networks, cables containing multiple optical fiber pairs can be placed underwater for very long distances. The number of fiber pairs in a subsea/submarine cable is often a key characteristic of the cable. The total capacity of a subsea/submarine cable is typically expressed as the capacity of each fiber pair multiplied by the number of fiber pairs (assuming each fiber pair has the same capacity).

The number of optical fiber pairs in a subsea/submarine cable typically affects various characteristics of the cable. For example, each optical fiber typically requires one or more amplifiers along the length of the subsea/submarine cable, and each amplifier requires electrical power to function. Thus, the number of optical fiber pairs in a subsea/submarine cable can affect the size, weight, cost, and power consumption associated with the cable. While this is somewhat different for terrestrial networks since power can be provided to amplifiers from sources outside a terrestrial cable, the number of optical fibers in a terrestrial cable still affects the size, weight, and cost associated with the cable.

Figure 4:
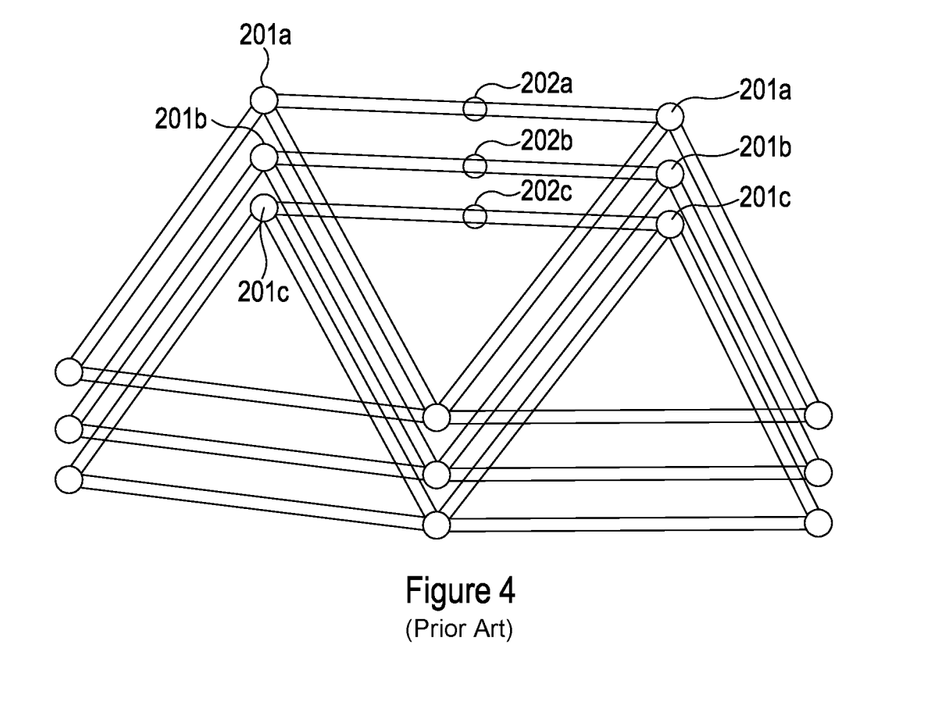
FIG. 4 is a further example of a prior art optical network, in which capacity has been increased, by increasing the number of fiber pairs between each node in the network.

Many optical networks today are seeing an explosion in the amount of transported traffic and their associated bandwidth needs. This is currently driven primarily by data and video traffic. More and more often, the transport of voice traffic is considered simply as a service provided by data networks or data infrastructures. Driven by the need for increased capacity, optical backbone and core networks are using a larger number of optical fiber pairs. In some approaches, backbone and core networks are simply being stacked. Subsea links across the Atlantic Ocean are one example, where more cables containing optical fiber pairs are run between locations. FIG. 4 illustrates one example of this approach, where DWDM networks are simply stacked (logically) on top of each other and are implemented using different cables containing optical fiber pairs (202a, 202b, 202c).

Figure 5:
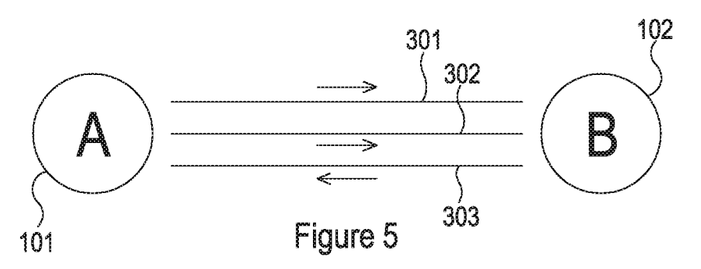
FIG. 5 shows an example method of increasing network capacity by provisioning a single unidirectional additional fiber between site A and site B.

This disclosure recognizes that it is possible to saturate a communication link between two points because the capacity limit of one optical fiber in a pair is reached without reaching the capacity limit of the other optical fiber in the pair. Stated another way, the traffic flowing in one direction over an optical fiber pair reaches its limit while the traffic flowing in the opposite direction over the optical fiber pair does not. This is due to an asymmetry in the traffic flowing between the two points. This disclosure therefore proposes the concept of creating or growing an optical network by fiber rather than by fiber pair. FIG. 5 illustrates a simple example of this, where there are two fibers 301, 302 supporting the transport of data from site A to site B and one fiber 303 supporting the transport of data from site B to site A. In this example, there is a traffic asymmetry of 0.5, meaning x bits are transported in one direction and 2x bits are transported in the other direction.

By providing the ability to provision optical fibers for unidirectional optical communication (OCM), the specific bandwidth and data transport needs between locations can be handled more effectively.

Figure 6:
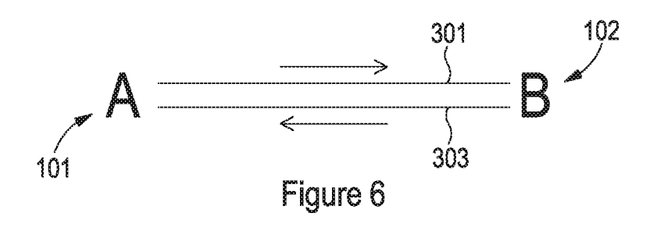
FIGS. 6 and 7 shows the evolution of a communication link between site A and site B, with FIG. 6 showing a conventional bi-directional link comprising two unidirectional fibers, and FIG. 7 adding a further unidirectional fiber from site A to site B.
Figure 7:
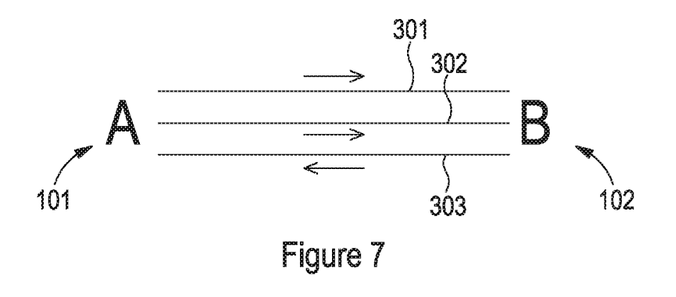

This disclosure helps to optimize the infrastructure resources of an optical network in order to achieve the benefits associated with unidirectional OCM. In some cases, one could imagine the evolution of a communication link as shown in FIG. 6 to the communication link as shown in FIG. 7. In FIG. 6, a single fiber pair (comprising fiber 301, 303) is used between site A and site B. However, due to asymmetry of transported traffic, one could add an additional unidirectional optical fiber 302 from site A to site B.

While the evolution shown in FIGS. 6 and 7 can occur, there are a few issues with this approach. For example, the optical network industry is designed around selling optical fiber pairs and equipment that functions with optical fiber pairs. Running a single optical fiber does not result in much cost savings compared to running an optical fiber pair. Also, equipping a single optical fiber for unidirectional transmission could require new network elements, since many standard network elements are designed assuming bidirectional communication over an optical fiber pair. In addition, network operators often like to have flexibility in terms of the network elements in their networks so that they can adapt to future changes in technology.

Figure 8:
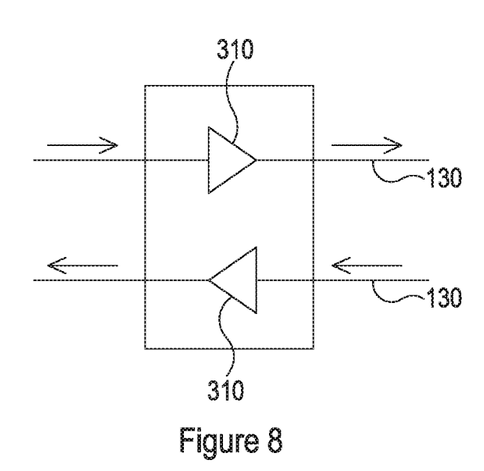
FIG. 8 shows an in line amplifier (ILA) designed to operate using a single fiber pair.

FIG. 8 illustrates one example of a network element, namely an ILA, that is designed to operate using an optical fiber pair 130. The ILA here includes two optical amplifiers 310, one for each optical fiber/transmission direction. The transmission directions are set by the architectures of the optical amplifiers 310, meaning the architectures of the optical amplifiers 310 define the direction in which optical amplification occurs. It is not possible to reverse the directions of optical amplification in these optical amplifiers 310.

Figure 9:
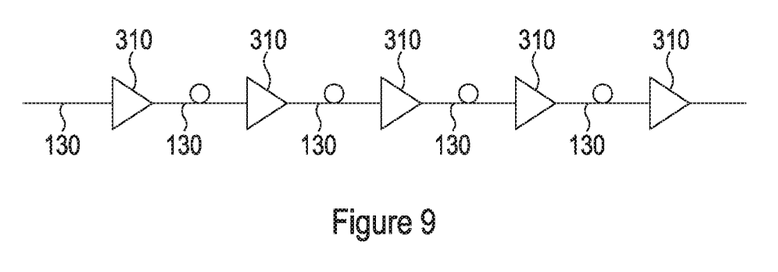
FIG. 9 depicts an example optical link including multiple spans of optical fiber linked by multiple amplifiers.

FIG. 9 illustrates an example optical link, where the link includes various spans of optical fiber 130 connected by various amplifiers 310. The optical link shown here could span a very long distance, such as up to hundreds of kilometers or more.

Figure 10A:
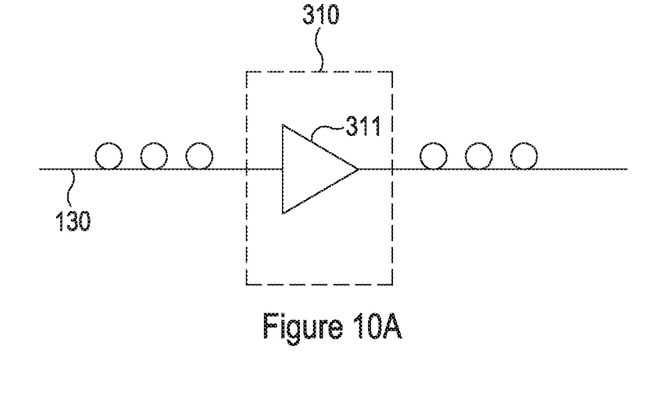
FIGS. 10A to 10C illustrates various different amplifiers that may be used in FIG. 9.
Figure 10B:
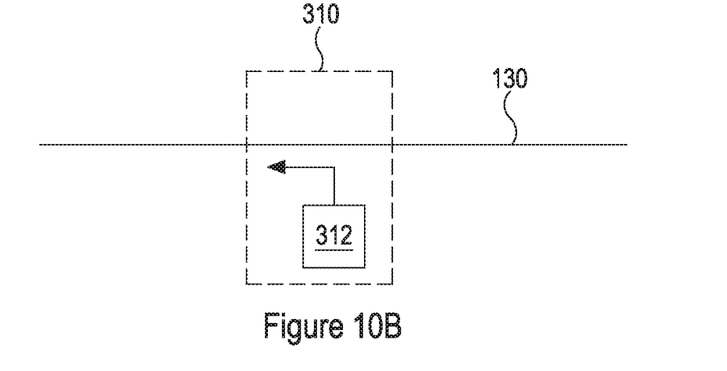
Figure 10C:
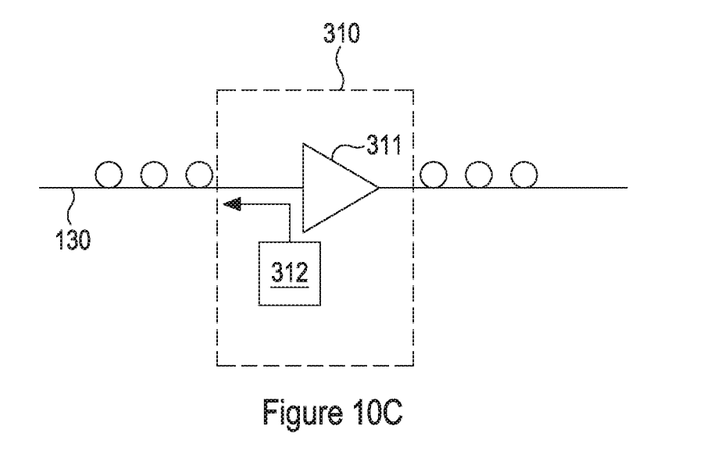

There are various types of optical amplifiers that could be used in FIG. 9. FIGS. 10A through 10C illustrate examples of these optical amplifiers. FIG. 10A illustrates a fully-discrete amplifier in which optical amplification occurs solely within the amplifier 311 itself. FIG. 10B illustrates a pumping amplifier that supports only distributed amplification, where the pumping amplifier 312 pumps optical energy into an optical fiber 130 transporting optical signals to the pumping amplifier and the optical energy creates amplification in the optical fiber. FIG. 10C illustrates a hybrid amplifier that uses both a discrete amplifier 311 and a pumping amplifier 312.

By design, these types of optical links can only transport optical signals in one direction. There is no flexibility and no ability to reconfigure this optical link to transport data in the opposite direction.

Figure 11A:
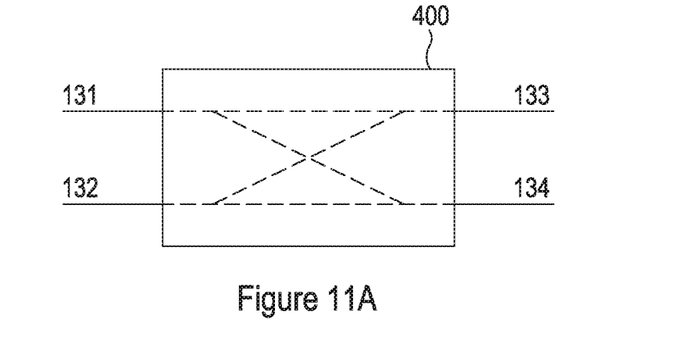
FIG. 11A illustrates an example 2×2 optical switch.

In accordance with this disclosure, the optical link is modified using optical switches in order to support the reversal of the transmission direction over an optical fiber. FIG. 11A illustrates an example 2×2 optical switch 400, and FIG. 11B illustrates example states of the 2×2 optical switch 400.

Figure 11B:
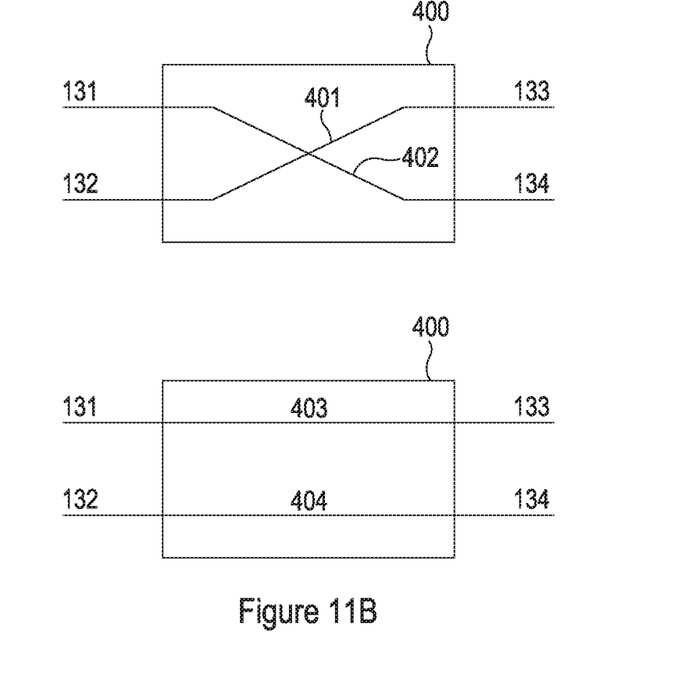
FIG. 11B illustrates a cross and bar state of the 2×2 optical switch.

The top state in FIG. 11B is referred to as the "cross" state, while the bottom state in FIG. 11B is referred to as the "bar" state.

Figure 12:
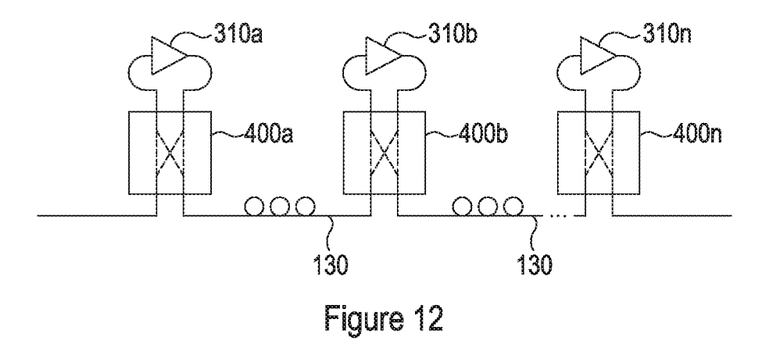
FIG. 12 illustrates an optical link according to an embodiment in which each amplifier is connected between adjacent optical spans using an optical switch that is operable to reverse the direction of traffic through the amplifier.

FIG. 12 illustrates an optical link with optical amplifiers 310a, 310b . . . 310n, where optical switches 410a, 410b . . . 410n are used to control the direction of optical transmission. Each optical amplifier 310a, 310b . . . 310n here is connected to two adjacent optical spans 130 through a 2×2 optical switch 410a, 410b . . . 410n. The 2×2 optical switches 400a, 400b . . . 400n can be configured in any suitable manner, such as via electrical or other control signals generated by a controller (which can be implemented in hardware or a combination of hardware and software/firmware instructions). The controller could, for instance, denote a network management system.

Figure 13:
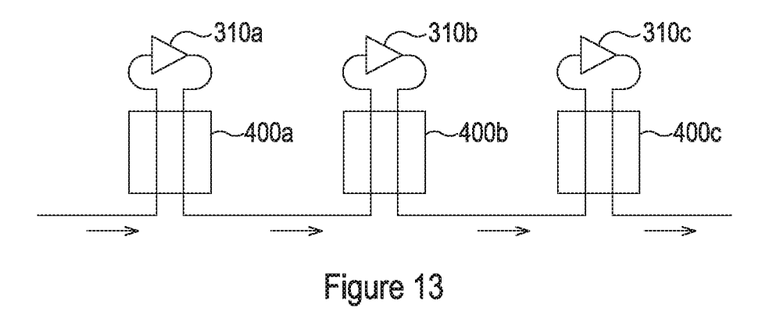
FIG. 13 illustrates operation of the link of FIG. 12 with each optical switch in the bar state, with traffic passing from west to east.

The optical link shown in FIG. 12 is configurable and reconfigurable by controlling the states of the 2×2 optical switches 400a, 400b . . . 400n. If all of the 2×2 optical switches 400a, 400b . . . 400n are in the "bar" state, the optical link transports traffic left to right as shown in FIG. 13. If all of the 2×2 optical switches 400a, 400b . . . 400n are in the "cross" state, the optical link transports traffic right to left as shown in FIG. 14.

Figure 14:
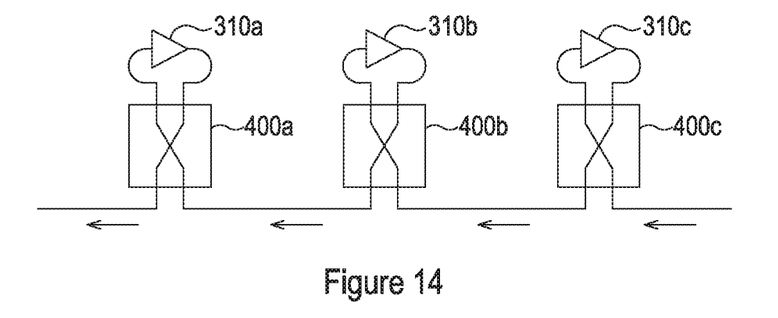
FIG. 14 illustrates operation of the link of FIG. 12 with each optical switch in the cross state, with traffic passing from east to west.

While not shown in FIGS. 12 through 14, there are typically various other network elements located between the optical amplifiers in the optical link or connected to the optical link that can operate properly regardless of the direction in which transmissions are occurring over an optical link. For example, a wavelength selective switch (WSS) is a building block of a multi-degree ROADM device, and the WSS can operate correctly regardless of the transmission direction. Those types of devices do not require any 2×2 optical switches in order to operate correctly.

Figure 15:
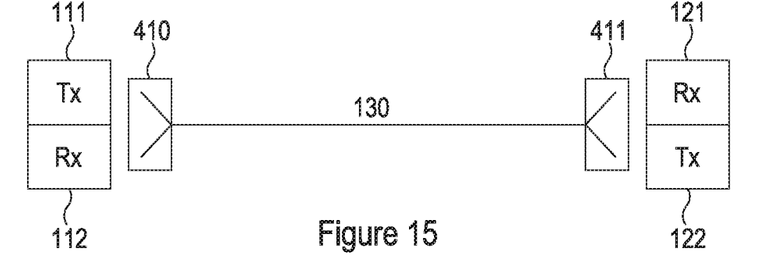
FIG. 15 depicts a reversible unidirectional fiber link between a first interface card and a second interface card, in which the direction of communication provided by the unidirectional fiber is reversed by operating a switching mechanism at the first and second interface card.

In addition, for components such as a ROADM or an end-point/terminal where an optical path starts or terminates, interface cards containing optical transmitters and optical receivers are often used. FIG. 15 illustrates an example in which the direction of communication through an optical fiber 130 is reversible using a switching mechanism 410, 411 (such as a 2×1 optical switch) coupling an optical transmitter 111, 122 and an optical receiver 112, 122 to a single optical fiber 130.

Figure 16:
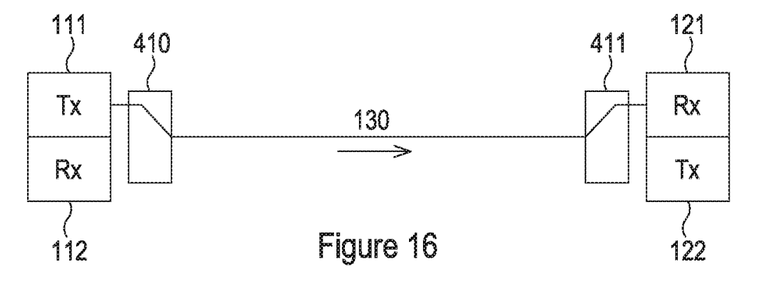
FIGS. 16 and 17 respectively illustrate the operation of the link of FIG. 15 in a west-east configuration and an east-west configuration.
Figure 17:
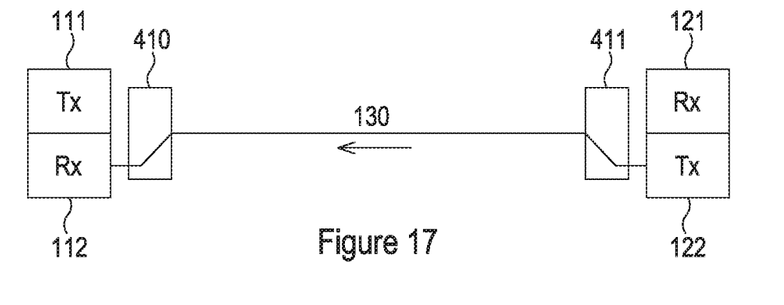

FIGS. 16 and 17 illustrate example configurations of the approach shown in FIG. 15. In FIG. 16 the communication is from left to right (west-east), with the switches 410, 411 connecting the western transmitter 111 to the eastern receiver 121. In FIG. 17 the communication is from right to left (east-west), with the switches 410, 411 connecting the eastern transmitter 122 to the western receiver 112.

However, other approaches could also be used as long as end-points/terminals and other devices can achieve the desired flexibility associated with the ability to reverse the transmission direction over an optical fiber.

Note that while the use of a single reversible optical fiber has been described above, this approach could be used with any number of fibers between any suitable devices in an optical network. For example, this approach could be used to support the reversal of any number of optical fibers connected to a multi-degree ROADM of an optical network. Also note that when a single device is coupled to multiple optical fibers, one, some, or all of those optical fibers could have a reversible transmission direction. In addition, note that the techniques described in U.S. Provisional Patent Application No. 62/159,694 can be implemented along with the techniques described in this patent document.

The following provides a specific example of the described techniques in order to demonstrate some of the benefits of these techniques. Assume there is a need for a subsea amplified cable for transport of optical signals over a long distance. A conventional cable might include six fiber pairs (twelve fibers total) that support the fixed use of six optical fibers in each direction. A cable constructed according to this disclosure could include twelve optical fibers, at least some of which have a reversible transmission direction.

With a traffic asymmetry of 0.5, the capacity of the conventional cable is limited by the combined capacity of the six fibers transporting data in the direction of heavier traffic. In the opposite direction, the other six fibers would be transporting data at half capacity, effectively meaning all data in the opposite direction could be transported over three of the six available optical fibers. In accordance with this disclosure, however, the cable could be reconfigured to use eight optical fibers to transport data in the direction of heavier traffic and four optical fibers to transport data in the opposite direction. This provides a 33% increase in the ability to transport data compared to the conventional cable. If the traffic asymmetry changes to a value of 0.33, the cable could be reconfigured to use nine optical fibers to transport data in the direction of heavier traffic and three optical fibers to transport data in the opposite direction. This provides a 50% increase in the ability to transport data compared to the conventional cable.

Among other things, the described approaches support increased capacity (total throughput) for a given infrastructure and its associated investment. Moreover, the described approaches support increased flexibility in how the infrastructure is managed. Infrastructure operators are able to configure and reconfigure optical fibers as needed to account for asymmetry of transported traffic and changes to transported traffic over time.

Note that in this disclosure, the term "unidirectional" does not strictly require that all traffic over an optical fiber only travel in one direction. Rather, the term "unidirectional" merely indicates that most or all of the data traffic over an optical fiber travels in one direction. In many instances, certain data can be sent in both directions of an optical fiber, such as over a supervisory channel, to help support management or other functions in an optical network. A "unidirectional" optical fiber may still allow the transport of data over a supervisory channel or other similar transmissions in multiple directions.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of the invention as defined by the following claims.

What is claimed is:

1. A system comprising:
   an optical link comprising a plurality of multiple spans of optical fiber and multiple network elements; and
   at least one switch configured to reverse a direction that at least one of the network elements communicates over at least one of the plurality of multiple spans of optical fiber to change a number of optical fibers being used for transmission in a first direction so that the optical link has greater capacity in the first direction than in an opposite second direction.

2. The system of claim 1, wherein the at least one network element comprises an optical amplifier coupled to two of the spans of optical fiber.

3. The system of claim 2, wherein the optical amplifier comprises a discrete amplifier.

4. The system of claim 2, wherein the optical amplifier comprises a pumping amplifier configured to support distributed amplification in one of the two spans of optical fiber.

5. The system of claim 1, wherein:
   the at least one switch comprises at least one optical switch coupled to the at least one network element; and
   each optical switch has:
      (i) a first state in which a respective one of the network elements is connected for communication in the first direction over the optical link; and
      (ii) a second state in which the respective network element is connected for communication in the second direction over the optical link.

6. The system of claim 5, wherein:
   the network elements are positioned at different locations along the optical link, the different locations linked by the spans of optical fiber; and
   the at least one optical switch comprises a plurality of optical switches, each optical switch coupled to a different one of the network elements at a different one of the locations.

7. The system of claim 1, wherein the plurality of multiple spans of optical fiber comprise optical fibers coupling a first point and a second point.

8. The system of claim 1, wherein the plurality of multiple spans of optical fiber comprise adjacent spans coupling together a series of points.

9. The system of claim 1, further comprising:
   an optical cable that includes the plurality of multiple spans of optical fiber.

10. The system of claim 1, wherein the at least one switch comprises at least one 2×2 optical switch.

11. The system of claim 1, further comprising:
    a terminal or end-point coupled to an end of the optical link, the terminal or end-point comprising at least one optical transmitter and at least one optical receiver configured to couple to at least one of the spans of optical fiber at the terminal or end-point.

12. The system of claim 11, wherein:
    a combined number of optical transmitters and optical receivers is greater than a number of spans of optical fiber coupled to the terminal or end-point; and
    at least one of the optical fibers at the terminal or end-point is coupled to at least one additional switch, each additional switch coupled to one of the at least one optical transmitter and one of the at least one optical receiver.

13. The system of claim 12, wherein each additional switch comprises a 2×1 optical switch.

14. The system of claim 12, wherein each additional switch is configured to selectively couple one of the at least one optical fiber to one of the at least one optical transmitter or one of the at least one optical receiver.

15. A method of controlling an optical link comprising a plurality of multiple spans of optical fiber and multiple network elements, the method comprising:
   configuring at least one switch coupled to at least one of the network elements to control a direction of communication by the at least one network element over at least one of the plurality of multiple spans of optical fiber; and
   reconfiguring the at least one switch to change the direction of communication by the at least one network element over the at least one of the plurality of multiple spans of optical fiber to change a number of optical fibers being used for transmission in a first direction so that the optical link has greater capacity in the first direction than in an opposite second direction.

16. The method of claim 15, further comprising:
   detecting or predicting an increased requirement for capacity in the first direction, wherein the at least one switch is configured in response to the detecting or predicting.

17. An apparatus comprising:
   a network element configured to be coupled to an optical link comprising a plurality of multiple spans of optical fiber; and
   a switch configured to reverse a direction that the network element communicates over one of the plurality of multiple spans of optical fiber to change a number of optical fibers being used for transmission in a first direction so that the optical link has greater capacity in the first direction than in an opposite second direction.

18. The apparatus of claim 17, wherein:
   the switch comprises an optical switch coupled to the network element; and
   the optical switch has:
      (i) a first state in which the network element is connected for communication in the first direction over the optical link; and
      (ii) a second state in which the network element is connected for communication in the second direction over the optical link.

19. The apparatus of claim 17, wherein the switch comprises a 2×2 optical switch.

20. The apparatus of claim 17, further comprising:
   a controller configured to detect or predict an increased requirement for capacity in the first direction and, in response, to adjust the switch in order to change the number of optical fibers being used for transmission in the first direction.

* * * * *